(12) United States Patent
Konishi

(10) Patent No.: US 10,803,615 B2
(45) Date of Patent: *Oct. 13, 2020

(54) OBJECT RECOGNITION PROCESSING APPARATUS, OBJECT RECOGNITION PROCESSING METHOD, AND PROGRAM

(71) Applicant: OMRON Corporation, Kyoto-shi, Kyoto (JP)

(72) Inventor: Yoshinori Konishi, Souraku-gun (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/164,184

(22) Filed: Oct. 18, 2018

(65) Prior Publication Data

US 2019/0197727 A1 Jun. 27, 2019

(30) Foreign Application Priority Data

Dec. 25, 2017 (JP) ................... 2017-247849

(51) Int. Cl.
*G06T 7/73* (2017.01)
*G06K 9/62* (2006.01)
*G06K 9/00* (2006.01)

(52) U.S. Cl.
CPC ............ *G06T 7/74* (2017.01); *G06K 9/00201* (2013.01); *G06K 9/6202* (2013.01)

(58) Field of Classification Search
CPC .... G06T 7/70; G06T 7/13; G06T 7/73; G06T 7/74; G06T 19/00
See application file for complete search history.

(56) References Cited

U.S. PATENT DOCUMENTS 10,452,989 B2 * 10/2019 Majumdar ............. G06N 10/00
2003/0083850 A1 5/2003 Schmidt et al.
(Continued)

FOREIGN PATENT DOCUMENTS

JP 5116640 B2 1/2013
JP 2016-170605 A 9/2016

OTHER PUBLICATIONS

Wesierski Daniel et al., "Shape-Based Pose Estimation of Robotic Surgical Instruments", Proceedings(Image Analysis and Recognition: 11th International Conference, ICIAR 2014, Vilamoura, Portugal, Oct. 22-24, 2014), Sep. 8, 2017, Part I; In: Lecture Notes in Computer Science, vol. 8814; Relevance is indicated in the extended European search report dated May 21, 20019.

(Continued)

*Primary Examiner* — Diane D Mizrahi
(74) *Attorney, Agent, or Firm* — Metrolex IP Law Group, PLLC

(57) ABSTRACT

An object recognition processing apparatus includes: an image obtainment unit that obtains an image; a template matching unit that obtains a recognition result including a plurality of candidates for the object to be recognized by carrying out a template matching process on the image; a candidate exclusion processing unit that excludes a candidate that meets a predetermined condition by generating, for each of the plurality of candidates, a binary image of the object to be recognized, and finding a degree of overlap of each candidate using the binary image; and a recognition result output unit that outputs a candidate that remains without being excluded as a recognition result.

18 Claims, 10 Drawing Sheets

(56) References Cited

U.S. PATENT DOCUMENTS

2010/0329556 A1* 12/2010 Mitarai .................... G06K 9/38
                                                   382/170
2016/0328253 A1* 11/2016 Majumdar ............. G06N 10/00
2019/0095749 A1*  3/2019 Konishi ............... G06K 9/6202

OTHER PUBLICATIONS

The extended European search report dated May 21, 2019 in a counterpart European patent application.

* cited by examiner

OBJECT RECOGNITION PROCESSING APPARATUS, OBJECT RECOGNITION PROCESSING METHOD, AND PROGRAM

CROSS-REFERENCES TO RELATED APPLICATIONS

This application claims priority to Japanese Patent Application No. 2017-247849 filed Dec. 25, 2017, the entire contents of which are incorporated herein by reference.

FIELD

The disclosure relates to object recognition techniques using template matching.

BACKGROUND

Template matching is one method for recognizing a target object in an image. In template matching, a template for an object to be recognized is prepared in advance, and the degree to which features of an image match the template is evaluated to recognize the position, attitude, and so on of the object within the image. Object recognition using template matching is used in a variety of fields, including factory automation (FA)-related examination and picking, robot vision, surveillance cameras, and so on.

In object recognition processing using template matching, there are situations where multiple object candidates are recognized in a region of an input image in which only a single object is to be recognized. For example, the recognition result indicated in FIG. 8B may be obtained as a result of a template matching process on the input image indicated in FIG. 8A. A merging process, in which recognized candidates having similar positions and attitudes are merged into a single recognition result on the basis of parameters indicating the position and attitude of each candidate, is known as one method for handling such a situation. Since the merging process can be thought of as employing several candidates among the multiple candidates and discarding the remaining candidates, it can also be called a candidate exclusion process. For example, the post-merger recognition result indicated in FIG. 8C can be obtained by subjecting the recognition result of FIG. 8B to a merging process that takes candidates within 100 pixels from a reference candidate and then excludes, from those candidates, any candidates having a reference angle different from a reference angle of the reference candidate by 30 degrees or less.

Japanese Patent No. 5116640 discloses setting two or more thresholds for the angle difference between the reference angle of a reference candidate and the reference angle of the other candidates in a candidate merging process, which provides a suitable recognition result when carrying out a merging process on candidates for symmetrical objects.

Japanese Patent No. 5116640 is an example of background art.

However, there are cases where past merging processes do not exclude candidates that are actually to be excluded, such as a situation where many recognized candidates overlap with each other or candidates have been generated by erroneous recognition.

Consider, for example, the recognition result indicated in FIG. 9B, which has been obtained as a result of a template matching process on the input image indicated in FIG. 9A. FIG. 9C shows a region 901 in an enlarged state. In FIG. 9C, a candidate 902 is a candidate that should remain in the recognition result after the merging process, whereas a candidate 903 is a candidate that is mostly hidden under the candidate 902 and should be excluded from the recognition result. However, the candidate 902 and the candidate 903 have very different position and attitude parameters, and thus the candidate 903 cannot be excluded from the recognition result using the past method of excluding candidates on the basis of the position and attitude parameters.

There are also situations where candidates not to be excluded are actually excluded in past merging processes, such as when there are multiple types of objects to be recognized, or when, in three-dimensional object recognition, there is only one object to be recognized but the object has a different appearance depending on the viewpoint.

Consider, for example, the recognition result indicated in FIG. 10B, which has been obtained as a result of a template matching process on the input image indicated in FIG. 10A, which includes two objects to be recognized, indicated by 1001A and 1002A. FIG. 10B is a diagram illustrating candidates 1001B and 1002B, center positions 1003 and 1004 of those candidates, and vectors expressing the attitudes of the candidates. In the recognition result illustrated in FIG. 10B, the candidate 1001B and the candidate 1002B have different shapes and are thus candidates that should remain in the recognition result after the merging process. However, the candidate 1001B and the candidate 1002B have similar position and attitude parameters, and thus one of these candidates will be excluded from the recognition result using the past method of excluding candidates on the basis of the position and attitude parameters.

This phenomenon arises because the past merging process bases its determination only on the centers of gravity (or centers) and attitudes of the candidates. As such, if the object to be recognized has a limited volume (or area), the candidates cannot be properly excluded without taking the specific shape of the object to be recognized into consideration.

Accordingly, one or more aspects of the disclosure may provide a technique that makes it possible to appropriately exclude candidates that should be excluded when a plurality of candidates are recognized in an object recognition process, even if the objects to be recognized have different shapes, appearances, and so on.

SUMMARY

An object recognition processing apparatus according to an aspect includes: a processor (such as a central processing unit (CPU, dedicated circuit, application specific integrated circuit (ASIC), etc.) configured with a program to perform operations as units of the object recognition processing apparatus, an image obtainment unit configured to obtain an image including an object to be recognized; a template matching unit configured to obtain a recognition result including a plurality of candidates for the object to be recognized by carrying out a template matching process on the image using a plurality of templates, each template having been created using a two-dimensional image showing the object to be recognized from a given viewpoint and registered in advance; a candidate exclusion processing unit configured to exclude any candidate, among the plurality of candidates, that meets a predetermined condition, by generating, for each of the plurality of candidates, a binary image of the object to be recognized on the basis of a position and attitude of the candidate, and finding a degree of overlap of each candidate using the binary image; and a recognition result output unit configured to output any candidate, among the plurality of candidates, that remains without being excluded, as a recognition result.

Here, the "template" is data expressing an image feature of the object to be recognized. Any desired format can be used for the template. For example, an array format in which feature amounts of a plurality of feature points present in the image are written may be used. A "feature point" is a position, in coordinates of the image, indicating a predetermined feature, such as a boundary between objects in the image, a bending part and a curving part of a contour line of the object, or the like. The "binary image" is an image in which the region occupied by the object in the image is expressed as binary data. However, instead of a binary image, an image expressed by data greater than binary data, such as ternary data, may be used for the region occupied by the object in the image.

According to an aspect, using the degree of overlap among the candidates as the condition for excluding candidates makes it possible to appropriately exclude candidates that should be excluded, even if the objects to be recognized have different shapes, appearances, and so on.

In the above-described object recognition processing apparatus, the candidate exclusion processing unit may generate the binary image for each candidate on the basis of a binary image registered in advance in association with each template.

According to an aspect, the binary image is reused, which makes it possible to accelerate the object recognition process.

In the above-described object recognition processing apparatus, the candidate exclusion processing unit may include: temporary storage configured to store the unexcluded candidate; a first unit configured to rearrange the plurality of candidates in order by a score used in the template matching process; and a second unit configured to obtain, in that order, one by one of the rearranged plurality of candidates, compare a binary image generated on the basis of a position and attitude of the obtained candidate with a cumulative image of the binary images generated on the basis of the positions and attitudes of all the candidates stored in the temporary storage, and store the candidate in the temporary storage if a degree of overlap between the stated images is less than a predetermined threshold. Here, after the second unit has been executed for all of the plurality of candidates, the recognition result output unit may output the candidate stored in the temporary storage as the recognition result.

According to an aspect, whether or not to exclude a candidate is determined in order of scores in the template matching process, and the candidates that remain without being excluded are stored in the temporary storage. Accordingly, of the candidates included in the recognition result, the candidates that should be excluded can be appropriately excluded while giving preference to candidates having higher scores.

In the above-described object recognition processing apparatus, the template may include a template identifier; the recognition result may include position parameters, attitude parameters, and a template identifier pertaining to the candidates of the object recognized in the input image; and the candidate exclusion processing unit may divide the candidates into groups on the basis of the template identifier, exclude candidates on the basis of the position parameters and the attitude parameters by groups associated with a common template identifier, and then exclude any candidate meeting the predetermined condition.

According to an aspect, the degree of overlap between candidates is used as the condition for excluding candidates, limiting the determination to candidates for which erroneous recognition can occur. This makes it possible to accelerate the object recognition process.

In the above-described object recognition processing apparatus, the template may include a template identifier, and may be associated with viewpoint information pertaining to the position of the viewpoint used when creating the template; the recognition result may include position parameters, attitude parameters, and a template identifier pertaining to the candidates of the object recognized in the input image; and the candidate exclusion processing unit may divide the candidates into groups on the basis of the viewpoint information associated with the template identifiers of the candidates, exclude candidates on the basis of the position parameters and the attitude parameters by group, and then exclude any candidate meeting the predetermined condition.

According to an aspect, the degree of overlap between candidates is used as the condition for excluding candidates, further limiting the determination to a range of candidates for which erroneous recognition can occur on the basis of viewpoint information, for example. This makes it possible to accelerate the object recognition process.

In the above-described object recognition processing apparatus, the candidate exclusion processing unit may generate the binary image for each candidate on the basis of a binary image having a shape of a contour that is simpler than a binary image of the object.

According to an aspect, a binary image having a shape of a contour that is simpler than a binary image of the object is rendered instead of the binary image of the object, which makes it possible to accelerate the object recognition process.

In the above-described object recognition processing apparatus, the candidate exclusion processing unit may exclude a candidate, among the plurality of candidates, that meets a predetermined condition by generating a three-dimensional binary image for each of the plurality of candidates on the basis of the position and attitude of that candidate and using the three-dimensional binary images to find a degree of overlap for each of the candidates.

According to an aspect, using a three-dimensional binary image makes it possible to achieve higher recognition accuracy than when using a two-dimensional binary image.

An object recognition process method executed by a computer, according to another aspect, includes: a step of obtaining an image including an object to be recognized; a step of obtaining a recognition result including a plurality of candidates for the object to be recognized by carrying out a template matching process on the image using a plurality of templates, each template having been created using a two-dimensional image showing the object to be recognized from a given viewpoint and registered in advance; a step of excluding any candidate, among the plurality of candidates, that meets a predetermined condition, by generating, for each of the plurality of candidates, a binary image of the object to be recognized on the basis of a position and attitude of the candidate, and finding a degree of overlap of each candidate using the binary image; and a step of outputting any candidate, among the plurality of candidates, that remains without being excluded, as a recognition result.

A program according to another aspect causes a computer to execute: a step of obtaining an image including an object to be recognized; a step of obtaining a recognition result including a plurality of candidates for the object to be recognized by carrying out a template matching process on the image using a plurality of templates, each template having been created using a two-dimensional image showing the object to be recognized from a given viewpoint and registered in advance; a step of excluding any candidate, among the plurality of candidates, that meets a predetermined condition, by generating, for each of the plurality of candidates, a binary image of the object to be recognized on the basis of a position and attitude of the candidate, and finding a degree of overlap of each candidate using the binary image; and a step of outputting any candidate, among the plurality of candidates, that remains without being excluded, as a recognition result.

According to one or more aspects, a technique that enables a candidate that should be excluded to be excluded appropriately when a plurality of candidates are recognized in an object recognition process, even if the objects to be recognized have different shapes, appearances, and so on, can be provided.

DETAILED DESCRIPTION

§ 1 Application Example

Figure 1:
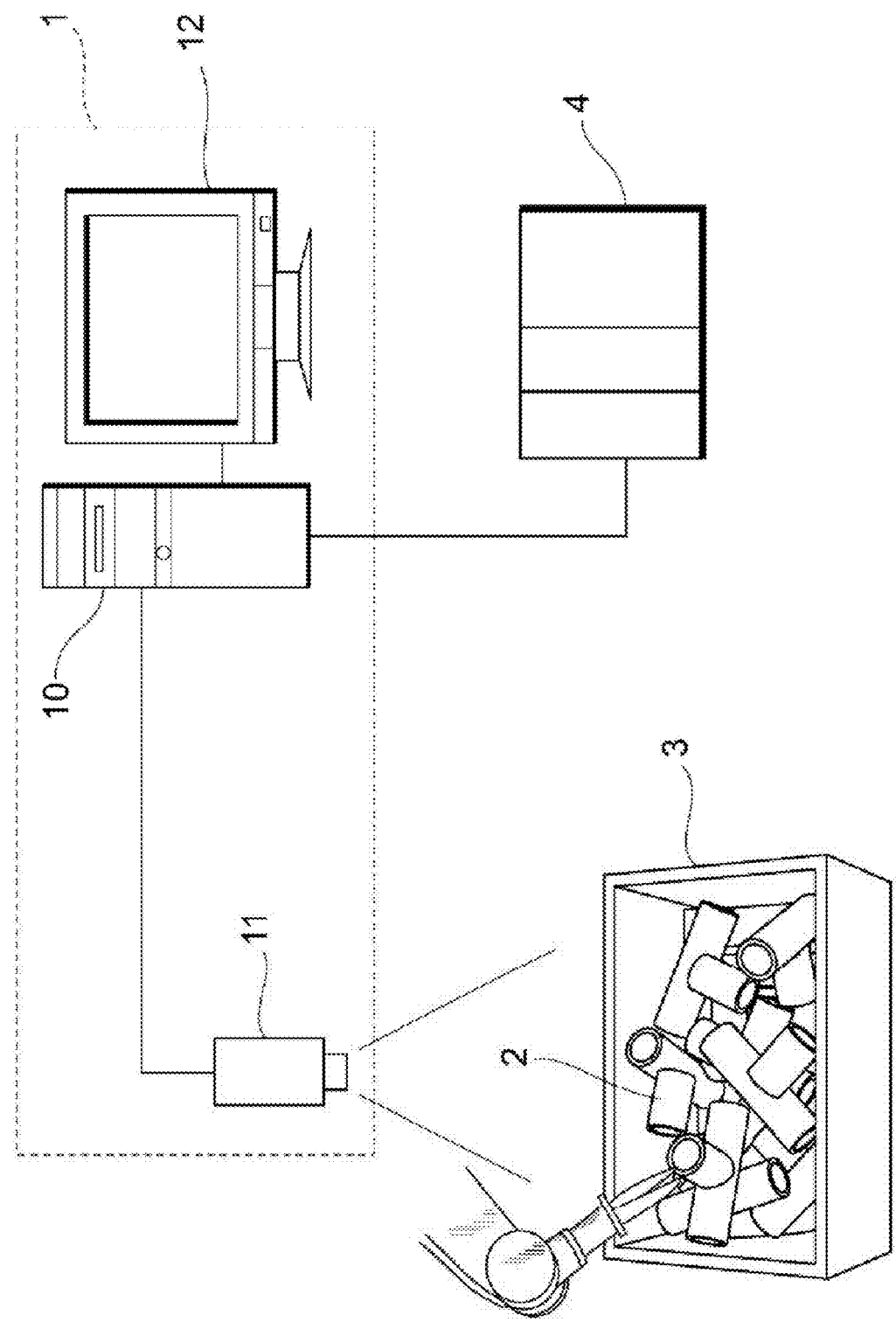
FIG. 1 is a diagram illustrating an example of a situation in which an object recognition apparatus according to an embodiment is applied.

First, an example of a situation in which an embodiment is applied will be described using FIG. 1. FIG. 1 is a diagram illustrating an example of a situation in which an object recognition apparatus 1 according to an embodiment is applied. The object recognition apparatus 1 may be a system, installed in a production line or the like, that recognizes objects 2 within a tray 3 using an image obtained from an image capturing device 11. The objects 2 to be recognized are piled randomly in the tray 3. Here, the objects 2 may include multiple types of objects, or may be a single type of object having a different appearance depending on the viewpoint. By obtaining images from the image capturing device 11 at predetermined intervals of time and carrying out a template matching process, the object recognition apparatus 1 executes a process of recognizing the position and attitude of each object 2 included in the image captured by the image capturing device 11 (also called an "input image" hereinafter), and outputs a result of that process to a programmable logic controller (PLC) 4, a display 12, or the like. A recognition result, which is the output of the object recognition apparatus 1, is used in picking/robot control, control of processing devices or printing devices, the inspection, measurement, and so on of the objects 2, and so on.

According to an embodiment, the object recognition apparatus 1 generates, for each of a plurality of candidates included in the recognition result obtained from the template matching process, a binary image (also called a "silhouette" hereinafter) of the object to be recognized on the basis of position and attitude parameters and the like of each candidate. The object recognition apparatus 1 compares the binary image of one candidate rendered in a temporary image with a cumulative image of the silhouettes of the candidate rendered in a silhouette map image, and determines whether or not to exclude the one candidate from the recognition result using a percentage of area or the like over which the two overlap. This makes it possible to appropriately exclude candidates that should be excluded, even if the objects to be recognized have different shapes or appearances, which was not possible with past methods that exclude candidates on the basis of position and attitude parameters.

As described earlier, the "silhouette" is an image in which the region occupied by the object in the image is expressed as binary data. However, the silhouette may be data other than binary data, such as ternary data, capable of expressing the region occupied by the object in the image. The "temporary image" is an image having a region corresponding to the input image, in which is rendered the silhouettes of the candidates for which an exclusion determination is to be carried out. The temporary image is an example of "temporary storage" according to an embodiment. The "silhouette map image" is an image having a region corresponding to the input image, in which the silhouettes of the candidates remaining after the exclusion determination are rendered in a cumulative manner. "Position parameters" are parameters expressing the position of a given recognition target object candidate, and may, for example, be the coordinates of a center of gravity position of that candidate in the input image. "Attitude parameters" are parameters expressing the attitude of a given recognition target object candidate, and may, for example, be a vector expressing the displacement of the attitude of the candidate from a reference attitude of the candidate.

§ 2 Configuration Example

Hardware Configuration

Object Recognition Apparatus

An example of the hardware configuration of the object recognition apparatus 1 will be described next using FIG. 2.

Generally speaking, the object recognition apparatus 1 is constituted by the image capturing device 11 and an image processing device 10.

The image capturing device 11 is an image capturing device for providing a digital image of the objects 2 to the image processing device 10. A complementary MOS (CMOS) camera, a charge-coupled device (CCD) camera, or the like can be used favorably as the image capturing device 11. The characteristics of the input image, such as the resolution, color/black-and-white, still image/moving image, tone, data format, and so on, can be set as desired, and can be selected as appropriate in accordance with the types of objects 2, the purpose of the sensing, and so on. If a special image aside from a visible light image, such as an x-ray image or a thermal image, is to be used for object recognition or inspection, an image capturing device that handles such images may be used.

Figure 2:
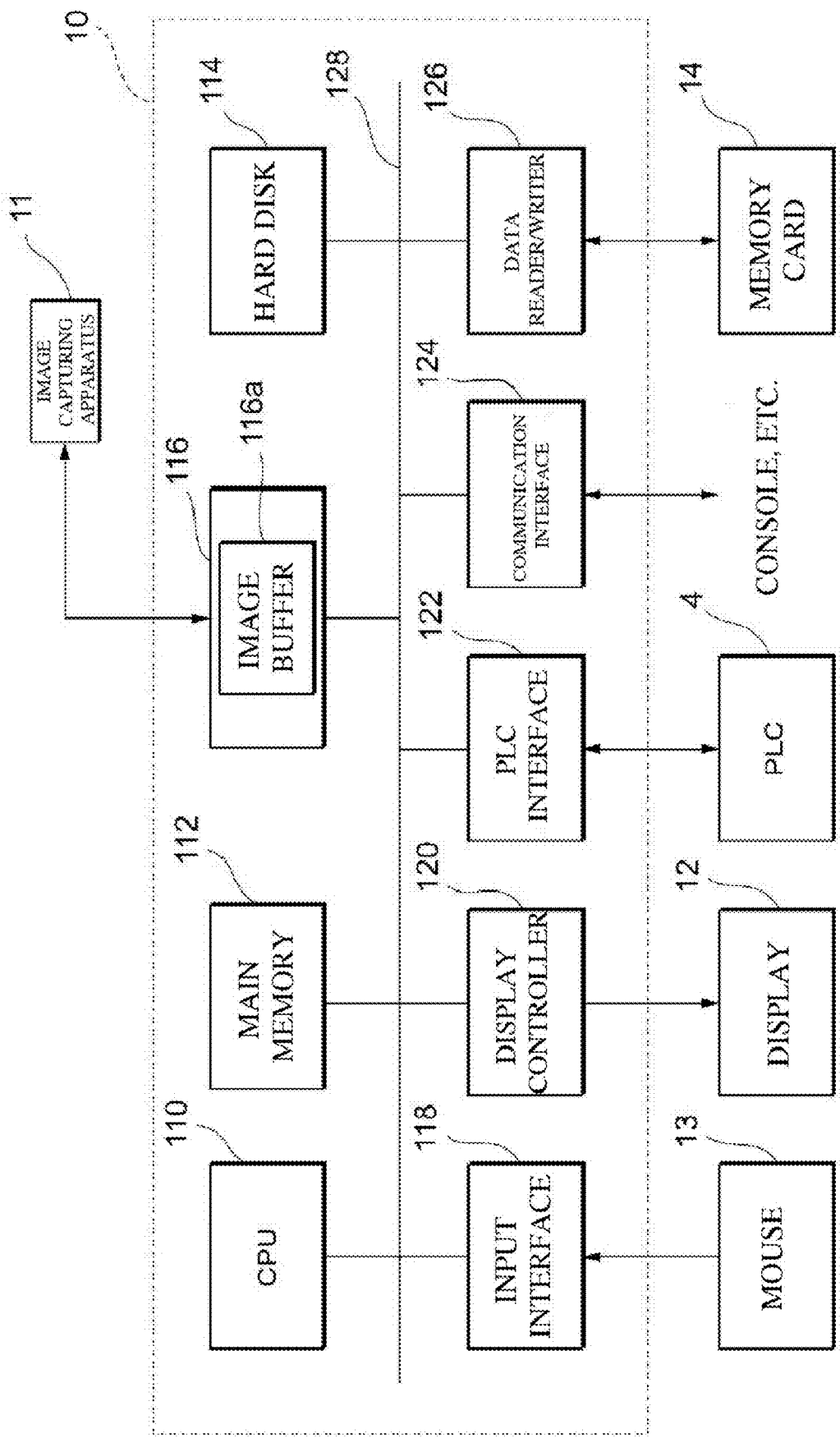
FIG. 2 is a diagram illustrating an example of the hardware configuration of an object recognition apparatus according to an embodiment.

As illustrated in FIG. 2, the image processing device 10 according to an embodiment may include: a CPU 110; main memory 112 used as work memory; a hard disk 114 used as a fixed storage unit; a camera interface 116; an input interface 118; a display controller 120; a PLC interface 122; a communication interface 124; and a data reader/writer 126. These units are connected to each other by a bus 128 so as to be capable of data communication with each other.

The camera interface 116 is a part that relays data between the CPU 110 and the image capturing device 11, and may include an image buffer 116a for temporarily storing image data from the image capturing device 11. The input interface 118 relays data between the CPU 110 and an input unit. The input unit may include, for example, a mouse 13, a keyboard, a touch panel, a jog controller, or the like. The display controller 120 is connected to a display 12 such as a liquid crystal monitor, and controls the content displayed in that display. The PLC interface 122 relays data between the CPU 110 and the PLC 4. The communication interface 124 relays data between the CPU 110 and the console, or between the CPU 110 and a personal computer, a server device, or the like. The data reader/writer 126 relays data between the CPU 110 and a memory card 14 serving as a recording medium.

The image processing device 10 can be configured as a computer having a generic architecture, and the CPU 110 executes various types of processes by loading programs stored in the hard disk 114 or the memory card 14. Such programs are distributed by being stored in a computer-readable recording medium such as a memory card 14 or an optical disk, or are provided over the Internet or the like. Note that the program according to an embodiment may be provided as a single application program, or may be provided as a module incorporated as part of another program. Some or all the processing executed by the program may be executed by a dedicated circuit such as an ASIC or the like.

Functional Configuration

Image Processing Device

Figure 3:
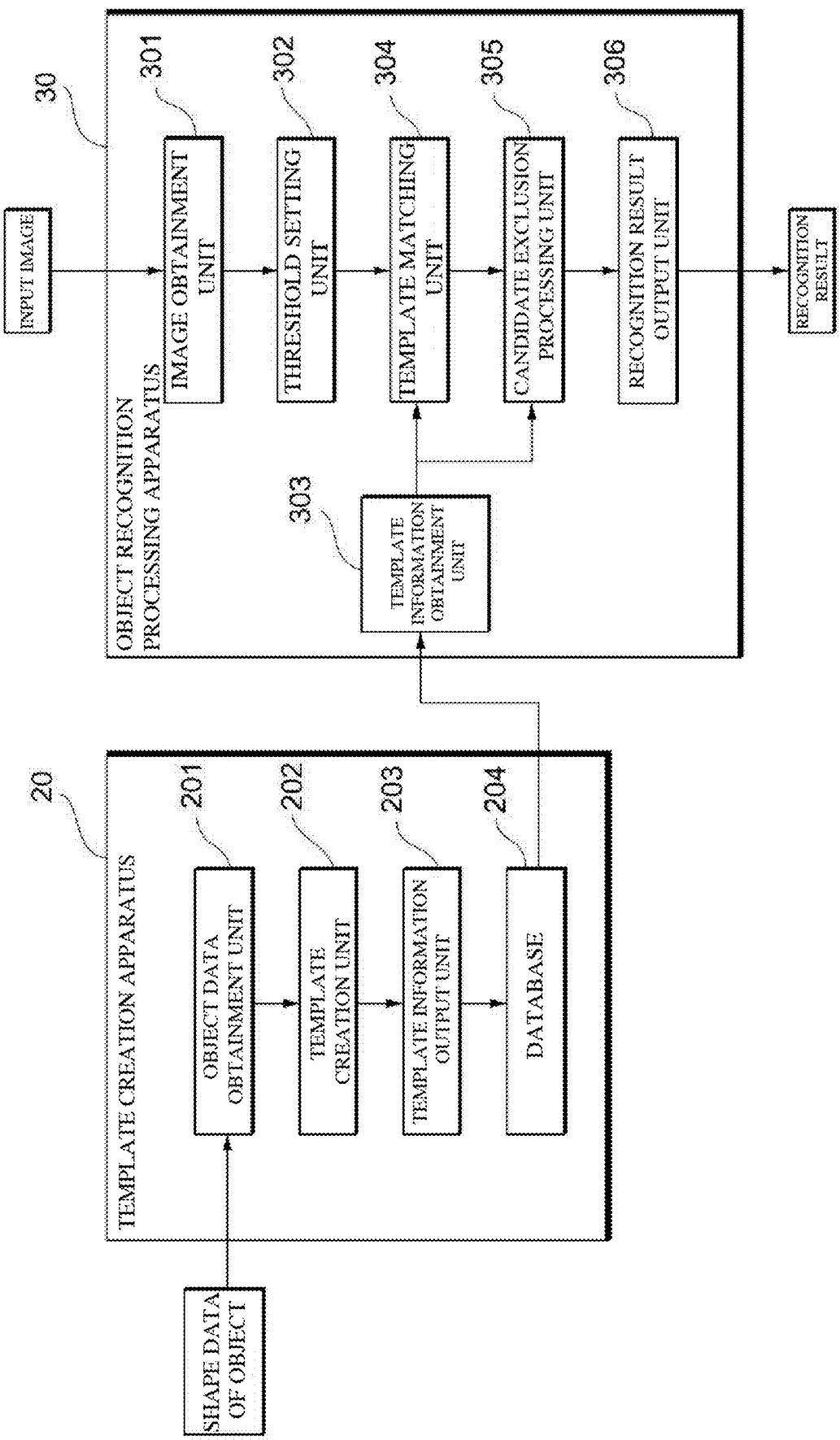
FIG. 3 is a diagram illustrating an example of the configuration of an object recognition apparatus according to an embodiment.

An example of the configuration of the image processing device 10 will be described next using FIG. 3. The image processing device 10 functions as a template creation apparatus 20 and an object recognition processing apparatus 30 by the CPU 110 loading programs stored in the hard disk 114 or the like.

The template creation apparatus 20 may be an apparatus that creates a template using an object recognition process. The template creation apparatus 20 includes an object data obtainment unit 201, a template creation unit 202, a template information output unit 203, and a database 204.

The object recognition processing apparatus 30 may be an apparatus that recognizes an object in an image by carrying out a template matching process on an image obtained from the image capturing device 11 using a template created by the template creation apparatus 20 and then stored. The object recognition processing apparatus 30 includes an image obtainment unit 301, a threshold setting unit 302, a template information obtainment unit 303, a template matching unit 304, a candidate exclusion processing unit 305, and a recognition result output unit 306.

Template Creation Apparatus

The object data obtainment unit 201 obtains data expressing the shape of an object 2 to be recognized. Depending on the shape of the object 2 to be recognized, the object data obtainment unit 201 can obtain two-dimensional data expressing the two-dimensional shape of the object 2, or can obtain three-dimensional data expressing the three-dimensional shape of the object 2. The object data obtainment unit 201 can obtain the data expressing the shape of the object 2 from an external server or the like, or can obtain the data expressing the shape of the object 2 from the hard disk 114 or the memory card 14.

The template creation unit 202 creates a template using the data expressing the shape of the object 2, which has been obtained by the object data obtainment unit 201. If the object data obtainment unit 201 has obtained three-dimensional data of the object 2, the template creation unit 202 may generate two-dimensional images of the object 2 from a plurality of viewpoints and create a template from the generated two-dimensional images. The template creation unit 202 may create the template including a template identifier that can uniquely identify the template. The template creation unit 202 may also create a silhouette of the object 2 expressed by the template. Any known method can be used to detect feature points and calculate feature amounts when creating the template, and thus detailed descriptions thereof will not be given in this specification.

Pixel values (brightnesses), brightness gradient directions, quantization gradient directions, normal directions, normal direction distributions, Histograms of Oriented Gradients (HOG), HAAR-Like, Scale-Invariant Feature Transform (SIFT), and so on can be used as the feature amount, for example.

The template information output unit 203 stores the template created by the template creation unit 202 in the database 204. If a silhouette of the object 2 expressed by the template has been created, the template information output unit 203 may store the silhouette in the database 204 in association with the template. Furthermore, if the appearance of the object 2 differs depending on the viewpoint and a plurality of templates have been created for the same object 2 from a plurality of viewpoints, the template information output unit 203 may store each template in the database 204 in association with viewpoint information pertaining to the position of the viewpoint used to create each template.

Object Recognition Apparatus

The image obtainment unit 301 obtains an input image from the image capturing device 11. The image obtainment unit 301 is an example of an "image obtainment unit" according to an embodiment.

The threshold setting unit 302 sets a threshold for excluding candidates from the recognition result, which is used by the candidate exclusion processing unit 305 (described later). In one embodiment, the threshold setting unit 302 may set a threshold for an overlap value indicating the percentage of overlap between the silhouette of one candidate and a cumulative image of the silhouettes of the remaining candidates not excluded. In another embodiment, the threshold setting unit 302 may set a threshold for an overlap value indicating the value of area over which the silhouette of one candidate overlaps with a cumulative image of the silhouettes of the remaining candidates not excluded.

The template information obtainment unit 303 obtains template information stored in the database 204 of the template creation apparatus 20 and supplies that information to the template matching unit 304. The template information obtainment unit 303 may obtain viewpoint information and/or silhouette information of the template stored in the database 204 of the template creation apparatus 20 and supply that information to the candidate exclusion processing unit 305.

The template matching unit 304 obtains a recognition result by detecting feature points in the input image and calculating a feature amount, and then carrying out a template matching process using the template information supplied from the template information obtainment unit 303 and the calculated feature amount. The feature amount calculated here is the same type of feature amount calculated by the template creation unit 202 when creating the template. The recognition result includes position parameters and attitude parameters pertaining to the candidates of the objects 2 recognized in the input image, a score indicating the degree to which image features match between the input image and the template, the template identifier, and so on. The template matching unit 304 is an example of a "template matching unit" according to an embodiment.

The candidate exclusion processing unit 305 rearranges the plurality of candidates included in the recognition result according to the scores, obtains the unprocessed candidate having the highest score, and renders the silhouette of the obtained candidate in the temporary image. The candidate exclusion processing unit 305 may render the silhouette on the basis of the position parameters, attitude parameters, and template identifier in the recognition result, or may render the silhouette on the basis of silhouette information created in advance and stored in association with the template.

The candidate exclusion processing unit 305 makes an exclusion determination by comparing the silhouette rendered in the temporary image with the cumulative image of the silhouettes of the remaining unexcluded candidates rendered in the silhouette map image, calculating the overlap value indicating the percentage or the like of the area of overlap between the two, and comparing the calculated overlap value with the threshold set by the threshold setting unit 302.

If the calculated overlap value is less than or equal to the threshold set by the threshold setting unit 302, the candidate exclusion processing unit 305 renders the silhouette of the candidate subject to the exclusion determination in the silhouette map image. However, if the calculated overlap value is greater than the threshold set by the threshold setting unit 302, the candidate exclusion processing unit 305 excludes the corresponding candidate from the recognition result. The candidate exclusion processing unit 305 carries out this process for all candidates included in the recognition result. The candidate exclusion processing unit 305 is an example of a "candidate exclusion processing unit" according to an embodiment. The overlap value being greater than the threshold is an example of a "predetermined condition" according to an embodiment.

Once the processing by the candidate exclusion processing unit 305 is complete, the recognition result output unit 306 outputs the recognition result from which candidates not meeting the predetermined condition have been excluded.

The recognition result output unit 306 is an example of a "recognition result output unit" according to an embodiment.

§ 3 Example of Operations

Template Creation Process

Figure 4:
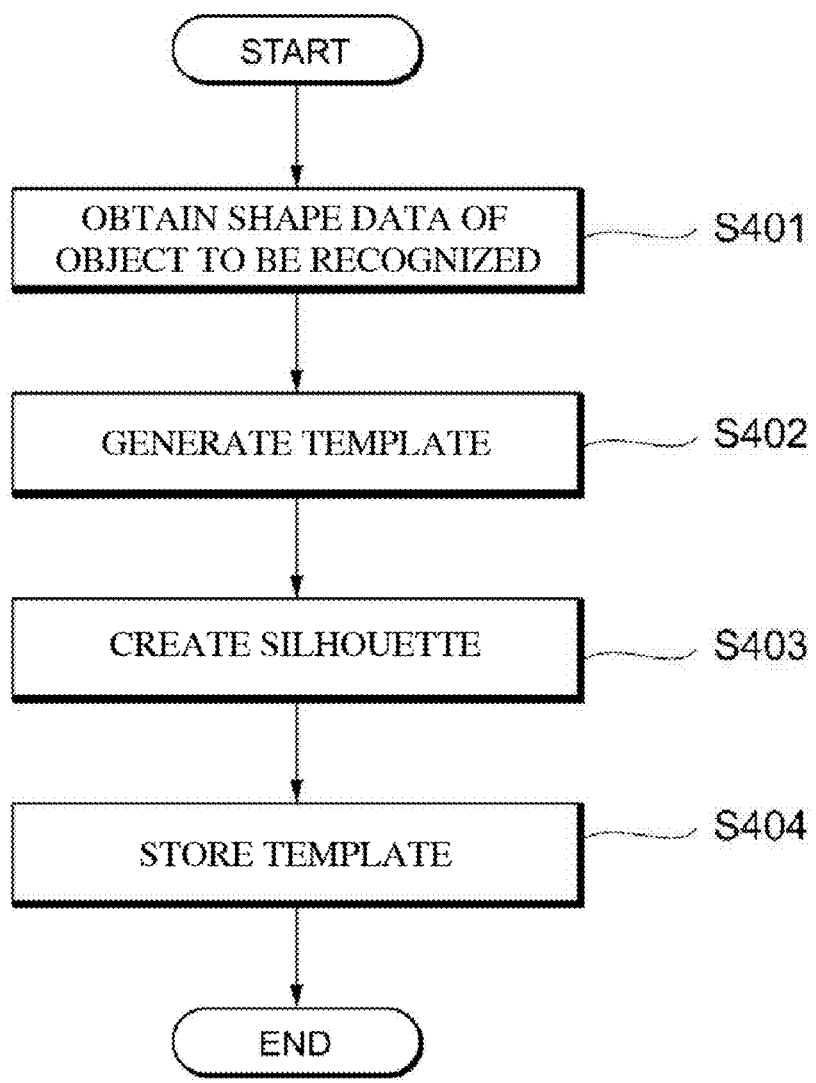
FIG. 4 is a flowchart illustrating an example of the flow of a template creation process executed by a template creation apparatus according to an embodiment.
Figure 5A:
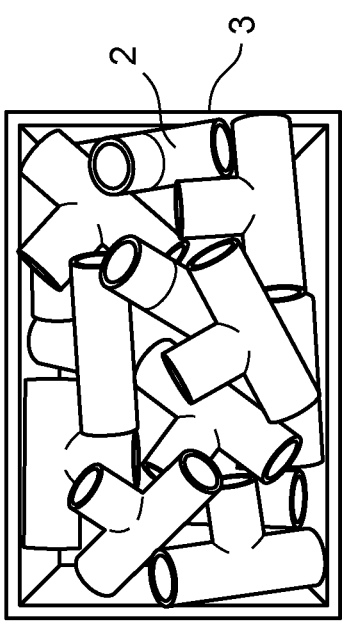
FIG. 5A is a diagram illustrating an example of an input image according to an embodiment.

An example of operations by the template creation apparatus 20 will be described next using FIG. 4. FIG. 4 is a flowchart illustrating an example of the flow of the template creation process executed by the template creation apparatus according to an embodiment. The template creation process illustrated in FIG. 4 is executed when the image processing device 10 is first installed, when the objects 2 to be recognized have changed, and so on. An embodiment assumes that a template for carrying out an object recognition process on the objects 2 in the input image illustrated in FIG. 5A is registered.

In step S401, the object data obtainment unit 201 of the template creation apparatus 20 obtains data expressing the shape of the object 2 to be recognized. In an embodiment, the object data obtainment unit 201 obtains three-dimensional CAD data from an external three-dimensional CAD server.

Next, in step S402, the template creation unit 202 of the template creation apparatus 20 creates a template using the data expressing the shape of the object 2, which has been obtained by the object data obtainment unit 201. In an embodiment, the template creation unit 202 creates a plurality of templates by generating two-dimensional images of the object 2 from a plurality of viewpoints using the three-dimensional CAD data obtained by the object data obtainment unit 201, and detecting feature points and calculating a feature amount for each of the generated two-dimensional images. Here, the template creation unit 202 creates the template including a template identifier that can uniquely identify the template.

Figure 5B:
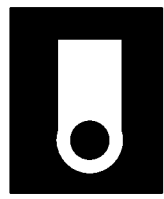
FIG. 5B is a diagram illustrating a silhouette of an object seen from a specific viewpoint.
Figure 5B:
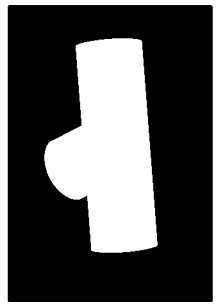
Figure 5B:
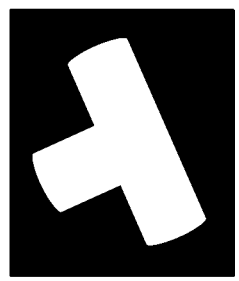
Figure 5B:
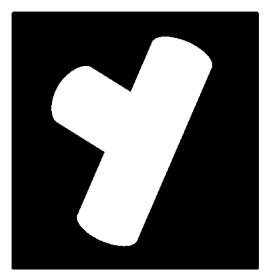
Figure 5B:
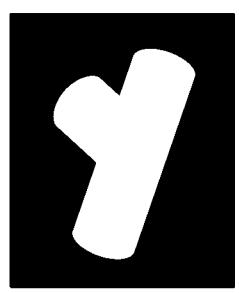

In step S403, the template creation unit 202 creates a silhouette of the object 2 expressed by the template. An embodiment assumes that a plurality of silhouettes are created, as illustrated in FIG. 5B. As illustrated in FIG. 5B, in an embodiment, the template creation unit 202 creates a silhouette in which a region expressing the presence of the object 2 is filled with white.

Finally, in step S404, the template information output unit 203 of the template creation apparatus 20 stores the template created by the template creation unit 202 in the database 204. In an embodiment, a plurality of templates representing a plurality of viewpoints are created, and silhouettes of the object 2 as seen from the plurality of viewpoints are furthermore created in step S403. Accordingly, the template information output unit 203 stores the template in the database 204 in association with the viewpoint information pertaining to the position of the viewpoint used to create that template and the silhouette of the object 2 as seen from the viewpoint when the template was created.

Object Recognition Process

Figure 6:
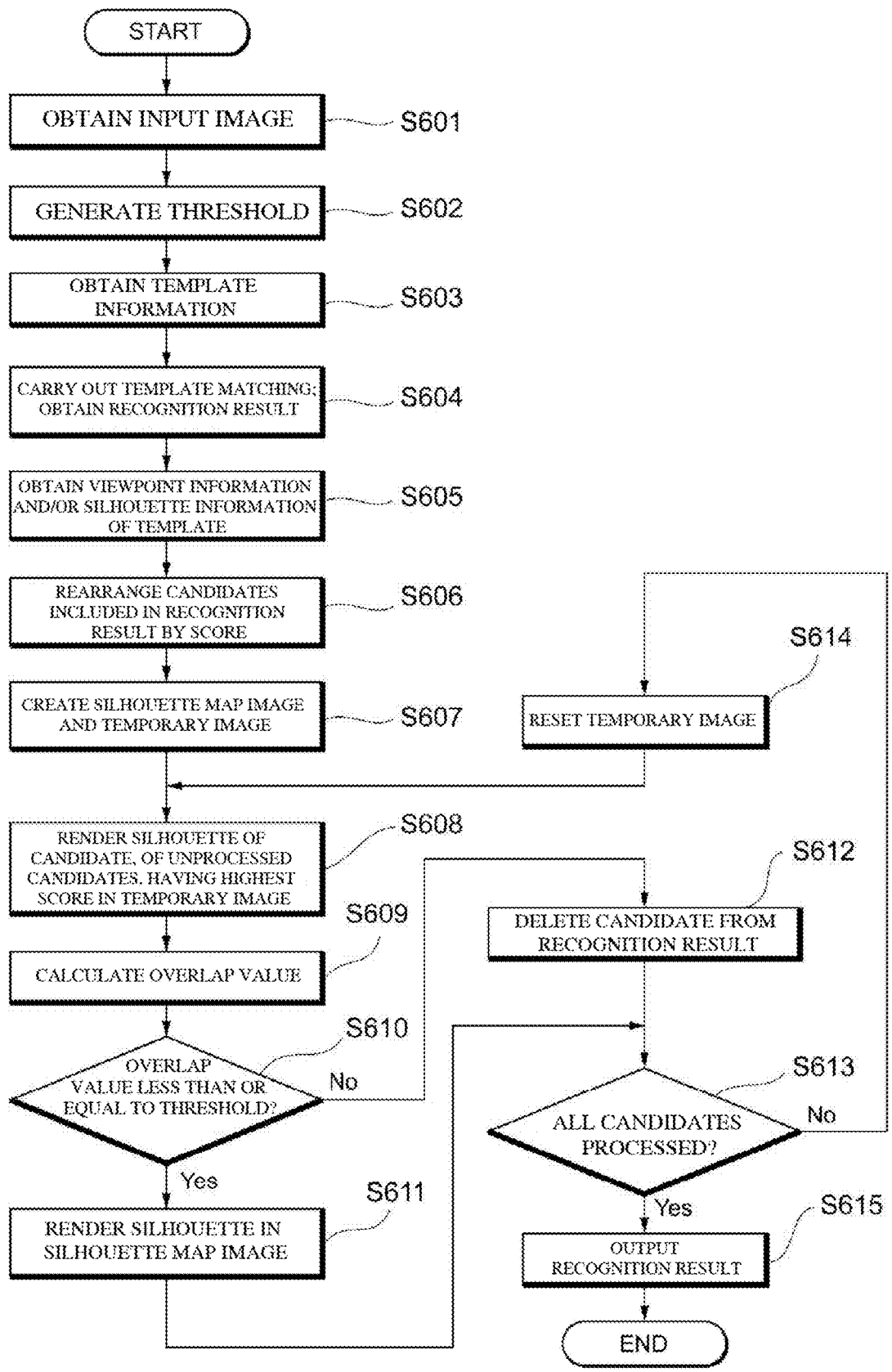
FIG. 6 is a flowchart illustrating an example of the flow of an object recognition process executed by an object recognition processing apparatus according to an embodiment.

An example of operations by the object recognition processing apparatus 30 will be described next using FIG. 6. FIG. 6 is a flowchart illustrating an example of the flow of the object recognition process executed by the object recognition processing apparatus according to an embodiment.

In step S601, the image obtainment unit 301 of the object recognition processing apparatus 30 obtains an input image from the image capturing device 11. Next, in step S602, the threshold setting unit 302 of the object recognition processing apparatus 30 sets a threshold for excluding candidates from the recognition result, which is used by the candidate exclusion processing unit 305. In an embodiment, the threshold setting unit 302 sets a threshold for an overlap value indicating the percentage of overlap between the silhouette of one candidate and a cumulative image of the silhouettes of the remaining candidates not excluded. Here, the threshold is set to 0.5.

Next, in step S603, the template information obtainment unit 303 of the object recognition processing apparatus 30 obtains template information stored in the database 204 of the template creation apparatus 20 and supplies that information to the template matching unit 304 of the object recognition processing apparatus 30.

In step S604, the template matching unit 304 obtains a recognition result by detecting feature points in the input image and calculating a feature amount, and then carrying out a template matching process using the template information supplied from the template information obtainment unit 303 and the calculated feature amount. As described earlier, the recognition result includes position parameters and attitude parameters pertaining to the candidates of the objects 2 recognized in the input image, a score indicating the degree to which image features match between the input image and the template, the template identifier, and so on.

Next, in step S605, the template information obtainment unit 303 obtains viewpoint information and/or silhouette information of the template stored in the database 204 of the template creation apparatus 20 and supplies that information to the candidate exclusion processing unit 305. In an embodiment, the template information obtainment unit 303 obtains the silhouette information stored in the database 204 and supplies that information to the candidate exclusion processing unit 305.

In step S606, the candidate exclusion processing unit 305 of the object recognition processing apparatus 30 arranges the plurality of candidates included in the recognition result by the scores of those candidates. In step S607, the candidate exclusion processing unit 305 creates the silhouette map image and the temporary image having regions corresponding to the input image. In an embodiment, the candidate exclusion processing unit 305 initializes the backgrounds of the silhouette map image and the temporary image to black in order to render the silhouette, in which a region expressing the presence of the object 2 is filled with white.

In step S608, the candidate exclusion processing unit 305 obtains the candidate having the highest score among the unprocessed candidates, and renders the silhouette of the obtained candidate in the temporary image on the basis of the silhouette information supplied in step S605. Next, in step S609, the candidate exclusion processing unit 305 compares the silhouette rendered in the temporary image with the cumulative image of the silhouettes of the remaining unexcluded candidates rendered in the silhouette map image, and calculates the overlap value indicating the percentage or the like of the area of overlap between the two. In an embodiment, the overlap value is calculated with the area of the silhouette rendered in the temporary image serving as the denominator. However, in another embodiment, the overlap value may be calculated using, as the denominator, the area of the silhouette of a candidate, among the candidates rendered in the silhouette map image, that overlaps with the silhouette rendered in the temporary image.

If the calculated overlap value is less than or equal to the threshold set by the threshold setting unit 302 (step S610: Yes), the candidate exclusion processing unit 305 renders the silhouette of the candidate subject to the exclusion determination in the silhouette map image (step S611). However, if the calculated overlap value is greater than the threshold set by the threshold setting unit 302 (step S610: No), the candidate exclusion processing unit 305 excludes the corresponding candidate from the recognition result (step S612).

In step S613, the candidate exclusion processing unit 305 determines whether or not all candidates have been subjected to the exclusion determination process. If an unprocessed candidate remains (step S613: No), in step S614, the candidate exclusion processing unit 305 resets the temporary image and returns to step S608 to continue the processing. On the other hand, if all candidates have been processed (step S613: Yes), the process advances to step S615, where the recognition result output unit 306 of the object recognition processing apparatus 30 outputs the recognition result from which candidates not meeting the predetermined condition have been excluded.

Candidate Exclusion Process

Figure 7:
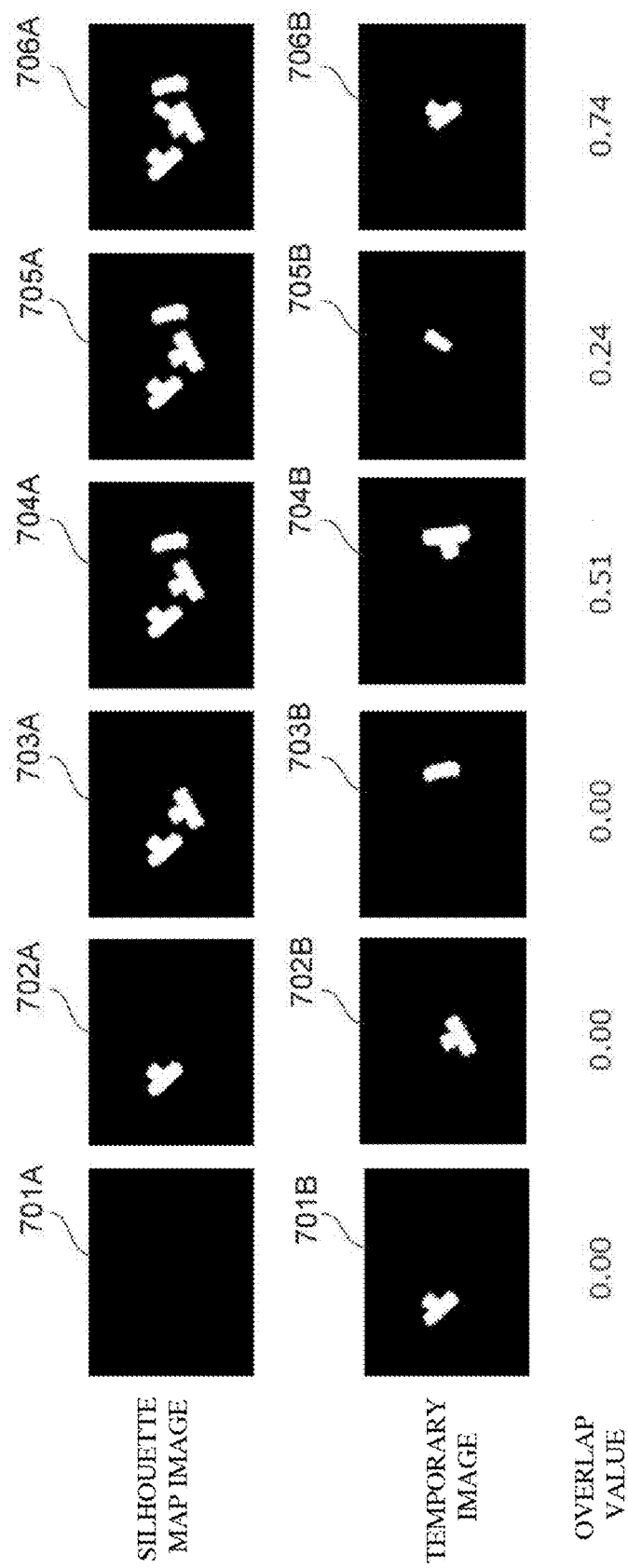
FIG. 7 is a diagram illustrating an example of a silhouette map image and a temporary image during an exclusion determination process according to an embodiment.
Figure 8A:
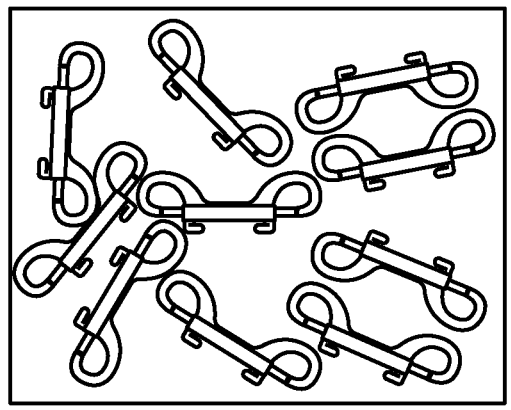
FIG. 8A is a diagram illustrating an example of an input image.
Figure 8B:
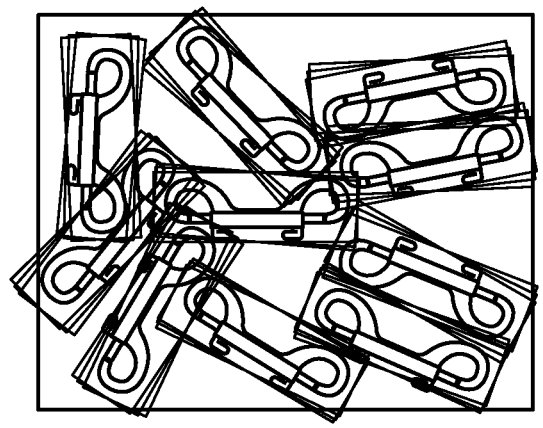
FIG. 8B is a diagram illustrating an example of a recognition result obtained by carrying out a template matching process on an input image.
Figure 8C:
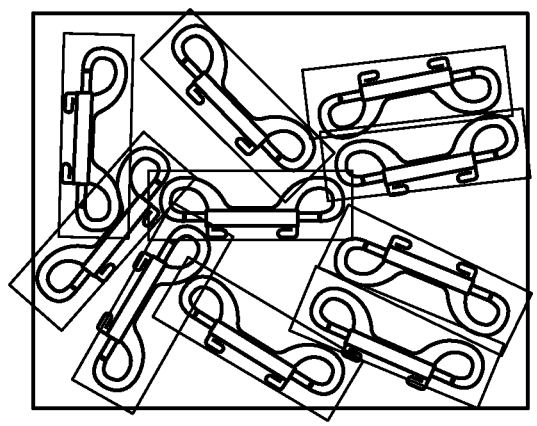
FIG. 8C is a diagram illustrating a post-merging process recognition result.
Figure 9A:
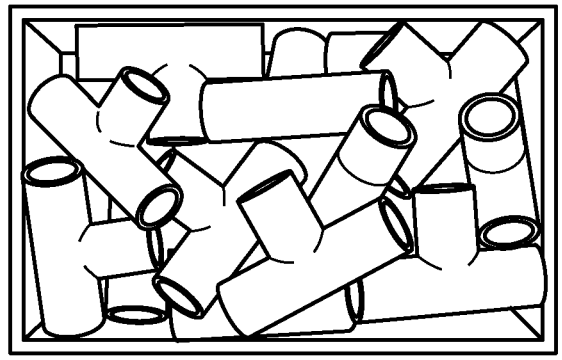
FIG. 9A is a diagram illustrating an example of an input image.
Figure 9B:
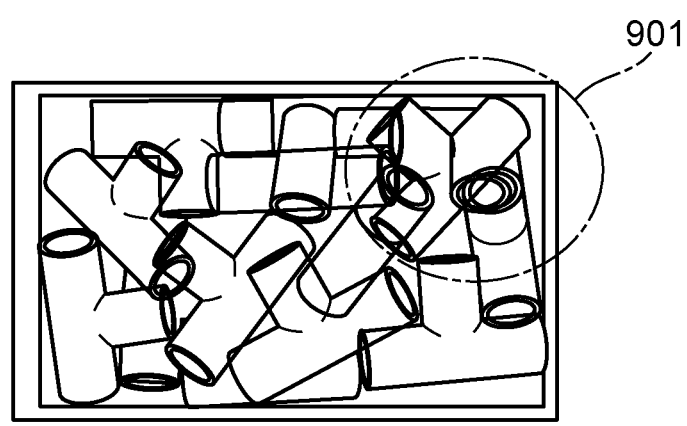
FIG. 9B is a diagram illustrating an example of a recognition result obtained by carrying out a template matching process on an input image.
Figure 9C:
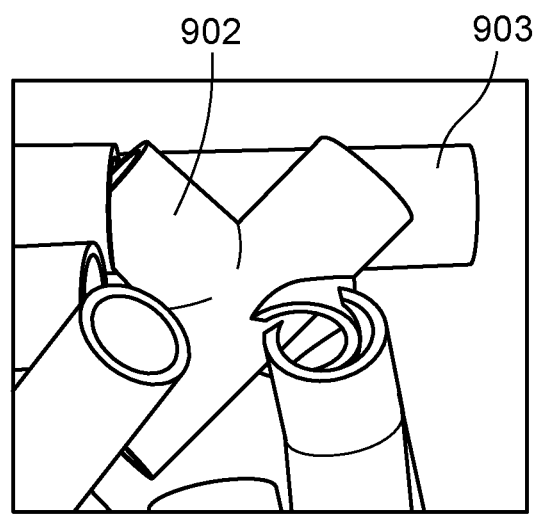
FIG. 9C is a diagram illustrating a part of a recognition result, such as in FIG. 9B, in an enlarged state.
Figure 10A:
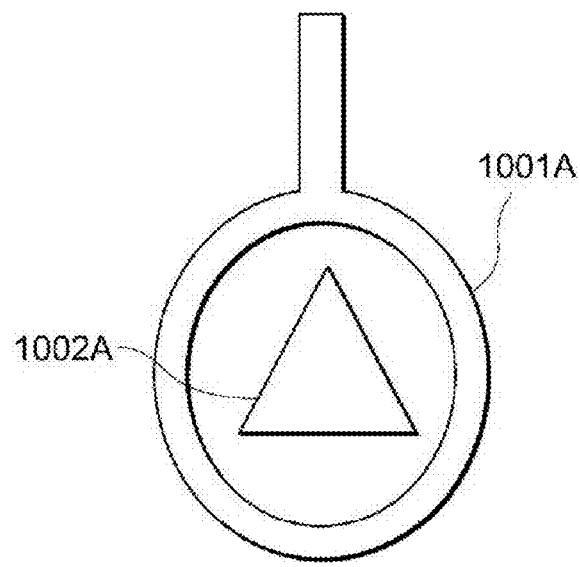
FIG. 10A is a diagram illustrating an example of an input image.
Figure 10B:
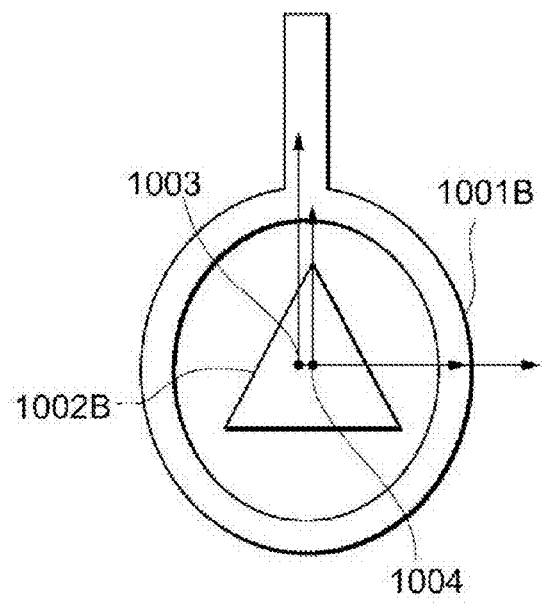
FIG. 10B is a diagram illustrating an example of a recognition result obtained by carrying out a template matching process on an input image.

Next, an example of operations in the candidate exclusion process carried out by the object recognition processing apparatus 30 will be described in detail using FIG. 7. FIG. 7 is a diagram illustrating an example of the silhouette map image and the temporary image during the exclusion determination process according to an embodiment. FIG. 7 illustrates examples of the silhouette map image and the temporary image when the candidate exclusion process from step S608 to step S614 is carried out on a recognition result including six candidates. An embodiment assumes that in step S602, the threshold setting unit 302 sets a threshold of 0.5 for the overlap value indicating the percentage of overlap between the silhouette of one candidate and the cumulative image of the silhouettes of the remaining candidates not excluded. It is also assumed that in step S607, the candidate exclusion processing unit 305 creates the silhouette map image (701A) having a region corresponding to the input image.

In the first instance of step S608, a candidate 1 is obtained as the candidate having the highest score among the unprocessed candidates in the recognition result, and the silhouette of the candidate 1 is rendered in the temporary image (701B). In the first instance of step S609, the candidate exclusion processing unit 305 compares the silhouette rendered in the temporary image with the cumulative image of the silhouettes of the remaining unexcluded candidates rendered in the silhouette map image, and calculates the overlap value indicating the percentage of the area of overlap between the two. Here, the overlap value is 0.00. In the first instance of step S610, the calculated overlap value is less than or equal to the threshold of 0.5 set by the threshold setting unit 302. The process therefore advances to step S611, where the candidate exclusion processing unit 305 renders the silhouette of the candidate 1 in the silhouette map image (702A). An unprocessed candidate is present in the first instance of step S613, and thus the process advances to step S614, where the temporary image is reset.

Likewise, in the second instance of step S608, a candidate 2 is obtained as the candidate having the highest score among the unprocessed candidates in the recognition result, and the silhouette of the candidate 2 is rendered in the temporary image (702B). In the second instance of step S609, the candidate exclusion processing unit 305 calculates the overlap value, which is 0.00 here. In the second instance of step S610, the calculated overlap value is less than or equal to the threshold of 0.5. The process therefore advances to step S611, where the candidate exclusion processing unit 305 renders the silhouette of the candidate 2 in the silhouette map image (703A). An unprocessed candidate is present in the second instance of step S613, and thus the process advances to step S614, where the temporary image is reset.

Likewise, in the third instance of step S608, the silhouette of a candidate 3 is rendered in the temporary image (703B). In the third instance of step S609, the candidate exclusion processing unit 305 calculates the overlap value, which is 0.00 here. In the third instance of step S610, the calculated overlap value is less than or equal to the threshold of 0.5. The process therefore advances to step S611, where the candidate exclusion processing unit 305 renders the silhouette of the candidate 3 in the silhouette map image (704A). An unprocessed candidate is present in the third instance of step S613, and thus the process advances to step S614, where the temporary image is reset.

In the fourth instance of step S608, the silhouette of a candidate 4 is rendered in the temporary image (704B). In the fourth instance of step S609, the candidate exclusion processing unit 305 calculates the overlap value, which is 0.51 here. In the fourth instance of step S610, the calculated overlap value is greater than the threshold of 0.5. The process therefore advances to step S612, where the candidate exclusion processing unit 305 excludes the candidate 4 from the recognition result. The silhouette map image is not updated, and thus the silhouette map image 705A at this time is no different from the silhouette map image 704A. An unprocessed candidate is present in the fourth instance of step S613, and thus the process advances to step S614, where the temporary image is reset.

Likewise, in the fifth instance of the processing, the silhouette of a candidate 5 is rendered in the silhouette map image in step S611 (706A), and in the sixth instance of the processing, a candidate 6 is excluded from the recognition result in step S612. In the sixth instance of step S613, all candidates have been processed, and the process thus advances to step S615, where the recognition result output unit 306 outputs the recognition result from which the candidate 4 and the candidate 6, which do not meet the predetermined condition, have been excluded.

§ 4 Variations

Although an embodiment has been described in detail thus far, the foregoing descriptions are intended to be no more than examples in all respects. It goes without saying that many improvements and variations can be made without departing from the scope of the present invention. Changes such as the following can be made, for example.

Variation 1

An embodiment may be carried out in combination with a known method of excluding candidates on the basis of position and attitude parameters. For example, the candidates included in the recognition result obtained in step S604 may be divided into groups on the basis of the candidate template identifiers, and candidates may then be excluded from the recognition result according to the known method on the basis of groups associated with common template identifiers.

Alternatively, in step S605, if the template information obtainment unit 303 has obtained the viewpoint information of templates stored in the database 204 of the template creation apparatus 20, the candidates included in the recognition result obtained in step S604 may be divided into groups on the basis of the template viewpoint information, and candidates may then be excluded from the recognition result according to the known method on the basis of the groups. For example, the groups may be formed on the basis of the positions of each of the plurality of viewpoints used to create the templates, and an identifier of the group to which the viewpoints belong may be used as the viewpoint information. For example, the groups may be formed in accordance with the shapes of the objects, so that the appearances of the objects from viewpoints belonging to the same group are similar, based on a predetermined benchmark.

By then subjecting all candidates not excluded through the known method to the processing of S606 and on, the exclusion determination can be limited to candidates between which erroneous recognitions can arise, using the percentage over which the candidates overlap or the like as the basis of the exclusion determination. This makes it possible to accelerate the object recognition process.

Variation 2

The foregoing descriptions describe an example in which the candidate exclusion processing unit 305 renders the silhouette of the object 2 corresponding to the candidate in the temporary image and the silhouette map image. Instead of the silhouette of an object 2 having, for example, an irregular and complicated contour, the candidate exclusion processing unit 305 may, in another embodiment, render the silhouette of a shape, among a predetermined group of shapes, that has a silhouette most closely resembling the silhouette of the object 2. In an embodiment, the template information output unit 203 may store the template in the database 204 in association with the silhouette of the shape, among the group of shapes, that has the silhouette most closely resembling the silhouette of the object 2.

For example, a shape having a contour that is simpler than the object 2 may be included in the group of shapes. This makes it possible to accelerate the object recognition process.

Variation 3

Although the foregoing descriptions describe an example in which the candidate exclusion processing unit 305 determines the candidates to exclude using two-dimensional silhouettes, the candidates to be excluded may be determined using three-dimensional voxel models. Using three-dimensional voxel models makes it possible to achieve higher recognition accuracy than when using two-dimensional silhouettes. The voxel model is an example of a "three-dimensional binary image" according to an embodiment.

Variation 4

In an embodiment, the candidate exclusion processing unit 305 may reduce the resolutions of the temporary image and the silhouette map image in which the silhouettes are rendered. This makes it possible to accelerate the object recognition process.

§ 5 Other Considerations

The present invention is not limited to a specific template matching method, and the object recognition processing apparatus 30 can employ any desired template matching method. Additionally, an algorithm for increasing the speed, such as a coarse-to-fine technique, can be applied as well.

Here, "unit" refers not only to a physical configuration, but also to cases where the process executed by that "unit" is realized by software. Furthermore, a process executed by a single "unit" or apparatus may be realized by two or more physical configurations or apparatuses, or a process executed by two or more "units" or apparatuses may be realized by a single physical configuration or apparatus.

The order of the steps of the processing described in this specification may be changed, or the steps executed in parallel, as long as no contradictions arise in the details of the processing.

The programs that implement the processes described in this specification may be stored in a recording medium.

Using this recording medium makes it possible to install the programs in the apparatuses constituting the image processing device 10. The recording medium storing the programs may be a non-transitory recording medium. The recording medium is not particularly limited to a non-transitory recording medium, and may be a CD-ROM or the like, for example.

Addendum 1

An object recognition processing apparatus comprising:
an image obtainment unit (301) configured to obtain an image including an object to be recognized;
a template matching unit (304) configured to obtain a recognition result including a plurality of candidates for the object to be recognized by carrying out a template matching process on the image using a plurality of templates, each template having been created using a two-dimensional image showing the object to be recognized from a given viewpoint and registered in advance;
a candidate exclusion processing unit (305) configured to exclude any candidate, among the plurality of candidates, that meets a predetermined condition, by generating, for each of the plurality of candidates, a binary image of the object to be recognized on the basis of a position and attitude of the candidate, and finding a degree of overlap of each candidate using the binary image; and
a recognition result output unit (306) configured to output any candidate, among the plurality of candidates, that remains without being excluded, as a recognition result.

Addendum 2

The object recognition processing apparatus according to addendum 1,
wherein the candidate exclusion processing unit (305) generates the binary image for each candidate on the basis of a binary image registered in advance in association with each template.

Addendum 3

The object recognition processing apparatus according to addendum 1 or 2,
wherein the candidate exclusion processing unit (305) includes:
temporary storage configured to store the unexcluded candidate;
a first unit configured to rearrange the plurality of candidates in order by a score used in the template matching process; and
a second unit configured to obtain, in that order, one by one of the rearranged plurality of candidates, compare a binary image generated on the basis of a position and attitude of the obtained candidate with a cumulative image of the binary images generated on the basis of the positions and attitudes of all the candidates stored in the temporary storage, and store the candidate in the temporary storage if a degree of overlap between the stated images is less than a predetermined threshold, and
wherein after the second unit has been executed for all of the plurality of candidates, the recognition result output unit outputs any candidates stored in the temporary storage as the recognition result.

Addendum 4

The object recognition processing apparatus according to any one of addenda 1 to 3,
wherein the template includes a template identifier;
the recognition result includes position parameters, attitude parameters, and a template identifier pertaining to the candidates of the object recognized in the input image; and
the candidate exclusion processing unit (305) divides the candidates into groups on the basis of the template identifier, excludes candidates on the basis of the position parameters and the attitude parameters by groups associated with a common template identifier, and then excludes a candidate meeting the predetermined condition.

Addendum 5

The object recognition processing apparatus according to any one of addenda 1 to 4,
wherein the template includes a template identifier, and is associated with viewpoint information pertaining to the position of the viewpoint used when creating the template;
the recognition result includes position parameters, attitude parameters, and a template identifier pertaining to the candidates of the object recognized in the input image; and
the candidate exclusion processing unit divides the candidates into groups on the basis of the viewpoint information associated with the template identifiers of the candidates, excludes candidates on the basis of the position parameters and the attitude parameters by group, and then excludes a candidate meeting the predetermined condition.

Addendum 6

The object recognition processing apparatus according to any one of addenda 1 to 5,
wherein the candidate exclusion processing unit (305) generates the binary image for each candidate on the basis of a binary image having a shape of a contour that is simpler than a binary image of the object.

Addendum 7

The object recognition processing apparatus according to any one of addenda 1 to 6,
wherein the candidate exclusion processing unit (305) excludes a candidate, among the plurality of candidates, that meets a predetermined condition by generating a three-dimensional binary image for each of the plurality of candidates on the basis of the position and attitude of that candidate and using the three-dimensional binary images to find a degree of overlap for each of the candidates.

Addendum 8

An object recognition process method executed by a computer, the method comprising:
a step (step S601) of obtaining an image including an object to be recognized;
a step (step S604) of obtaining a recognition result including a plurality of candidates for the object to be recognized by carrying out a template matching process on the image using a plurality of templates, each template having been created using a two-dimensional image showing the object to be recognized from a given viewpoint and registered in advance;
a step (step S607-step S614) of excluding any candidate, among the plurality of candidates, that meets a predetermined condition, by generating, for each of the plurality of candidates, a binary image of the object to be recognized on the basis of a position and attitude of the candidate, and finding a degree of overlap of each candidate using the binary image; and
a step (step S615) of outputting any candidate, among the plurality of candidates, that remains without being excluded, as a recognition result.

Addendum 9

A program causing a computer to execute:
a step (step S601) of obtaining an image including an object to be recognized;
a step (step S604) of obtaining a recognition result including a plurality of candidates for the object to be recognized by carrying out a template matching process on the image using a plurality of templates, each template having been created using a two-dimensional image showing the object to be recognized from a given viewpoint and registered in advance;

a step (step S607-step S614) of excluding any candidate, among the plurality of candidates, that meets a predetermined condition, by generating, for each of the plurality of candidates, a binary image of the object to be recognized on the basis of a position and attitude of the candidate, and finding a degree of overlap of each candidate using the binary image; and a step (step S615) of outputting any candidate, among the plurality of candidates, that remains without being excluded, as a recognition result.

The invention claimed is:

1. An object recognition processing apparatus comprising:
a processor configured with a program to perform operations comprising:
operation as an image obtainment unit configured to obtain an image including an object to be recognized;
operation as a template matching unit configured to obtain a recognition result comprising a plurality of candidates for the object to be recognized by carrying out a template matching process on the image using a plurality of templates, each template having been created using a two-dimensional image showing the object to be recognized from a given viewpoint and registered in advance;
operation as a candidate exclusion processing unit configured to exclude any candidate, among the plurality of candidates, that meets a predetermined condition, by generating, for each of the plurality of candidates, a binary image of the object to be recognized on the basis of a position and attitude of the candidate, and finding a degree of overlap of each candidate using the binary image; and
operation as a recognition result output unit configured to output any candidate, among the plurality of candidates, that remains without being excluded, as a recognition result.

2. The object recognition processing apparatus according to claim 1,
wherein the processor is configured with the program to perform operations such that operation as the candidate exclusion processing unit comprises operation as a candidate exclusion processing unit configured to generate the binary image for each candidate on the basis of a binary image registered in advance in association with each template.

3. The object recognition processing apparatus according to claim 2, wherein
the processor is configured with the program to perform operations such that operation as the candidate exclusion processing unit comprises:
operation as a temporary storage configured to store the unexcluded candidate;
operation as a first unit configured to rearrange the plurality of candidates in order by a score used in the template matching process; and
operation as a second unit configured to obtain, in the order arranged by the first unit, each of the rearranged plurality of candidates, compare a binary image generated on the basis of a position and attitude of the obtained candidate with a cumulative image of the binary images generated on the basis of the positions and attitudes of all the candidates stored in the temporary storage, and store the candidate in the temporary storage if a degree of overlap between the images is less than a predetermined threshold, and
the processor is configured with the program to perform operations such that, after the operation as the second unit has been executed for all of the plurality of candidates, operations as the recognition result output unit comprises outputting any candidates stored in the temporary storage as the recognition result.

4. The object recognition processing apparatus according to claim 2, wherein
the template comprises a template identifier;
the recognition result comprises position parameters, attitude parameters, and a template identifier pertaining to the candidates of the object recognized in the input image; and
the processor is configured with the program to perform operations such that operation as the candidate exclusion processing unit comprises operation as the candidate exclusion processing unit configured to divide the candidates into groups on the basis of the template identifier, to exclude candidates on the basis of the position parameters and the attitude parameters by groups associated with a common template identifier, and then to exclude any candidate meeting the predetermined condition.

5. The object recognition processing apparatus according to claim 2, wherein
the template comprises a template identifier, and is associated with viewpoint information pertaining to the position of the viewpoint used when creating the template;
the recognition result comprises position parameters, attitude parameters, and a template identifier pertaining to the candidates of the object recognized in the input image; and
the processor is configured with the program to perform operations such that operation as the candidate exclusion processing unit comprises operation as the candidate exclusion processing unit configured to divide the candidates into groups on the basis of the viewpoint information associated with the template identifiers of the candidates, to exclude candidates on the basis of the position parameters and the attitude parameters by group, and then to exclude a candidate meeting the predetermined condition.

6. The object recognition processing apparatus according to claim 2,
wherein the processor is configured with the program to perform operations such that operation as the candidate exclusion processing unit comprises operation as the candidate exclusion processing unit configured to generate the binary image for each candidate on the basis of a binary image having a shape of a contour that is simpler than a binary image of the object.

7. The object recognition processing apparatus according to claim 1, wherein
the processor is configured with the program to perform operations such that operation as the candidate exclusion processing unit comprises:
operation as temporary storage configured to store the unexcluded candidate;
operation as a first unit configured to rearrange the plurality of candidates in order by a score used in the template matching process; and
operation as a second unit configured to obtain, in the order arranged by the first unit, each of the rearranged plurality of candidates, compare a binary image generated on the basis of a position and attitude of the obtained candidate with a cumulative image of the binary images generated on the basis of the positions and attitudes of all the candidates stored in the temporary storage, and store the candidate in the temporary storage if a degree of overlap between the images is less than a predetermined threshold, and the processor is configured with the program to perform operations such that, after the operation as the second unit has been executed for all of the plurality of candidates, operation as the recognition result output unit comprises outputting any candidates stored in the temporary storage as the recognition result.

8. The object recognition processing apparatus according to claim 7, wherein the template comprises a template identifier;

the recognition result comprises position parameters, attitude parameters, and a template identifier pertaining to the candidates of the object recognized in the input image; and the processor is configured with the program to perform operations such that operation as the candidate exclusion processing unit comprises operation as the candidate exclusion processing unit configured to divide the candidates into groups on the basis of the template identifier, to exclude candidates on the basis of the position parameters and the attitude parameters by groups associated with a common template identifier, and then to exclude any candidate meeting the predetermined condition.

9. The object recognition processing apparatus according to claim 7, wherein the template comprises a template identifier, and is associated with viewpoint information pertaining to the position of the viewpoint used when creating the template;

the recognition result comprises position parameters, attitude parameters, and a template identifier pertaining to the candidates of the object recognized in the input image; and the processor is configured with the program to perform operations such that operation as the candidate exclusion processing unit comprises operation as the candidate exclusion processing unit configured to divide the candidates into groups on the basis of the viewpoint information associated with the template identifiers of the candidates, to exclude candidates on the basis of the position parameters and the attitude parameters by group, and then to exclude a candidate meeting the predetermined condition.

10. The object recognition processing apparatus according to claim 7, wherein the processor is configured with the program to perform operations such that operation as the candidate exclusion processing unit comprises operation as the candidate exclusion processing unit configured to generate the binary image for each candidate on the basis of a binary image having a shape of a contour that is simpler than a binary image of the object.

11. The object recognition processing apparatus according to claim 1, wherein the template comprises a template identifier;

the recognition result comprises position parameters, attitude parameters, and a template identifier pertaining to the candidates of the object recognized in the input image; and the processor is configured with the program to perform operations such that operation as the candidate exclusion processing unit comprises operation as the candidate exclusion processing unit configured to divide the candidates into groups on the basis of the template identifier, to exclude candidates on the basis of the position parameters and the attitude parameters by groups associated with a common template identifier, and to exclude any candidate meeting the predetermined condition.

12. The object recognition processing apparatus according to claim 1, wherein the template comprises a template identifier, and is associated with viewpoint information pertaining to the position of the viewpoint used when creating the template;

the recognition result comprises position parameters, attitude parameters, and a template identifier pertaining to the candidates of the object recognized in the input image; and the processor is configured with the program to perform operations such that operation as the candidate exclusion processing unit comprises operation as the candidate exclusion processing unit configured to divide the candidates into groups on the basis of the viewpoint information associated with the template identifiers of the candidates, to exclude candidates on the basis of the position parameters and the attitude parameters by group, and then to exclude a candidate meeting the predetermined condition.

13. The object recognition processing apparatus according to claim 1, wherein the processor is configured with the program to perform operations such that operation as the candidate exclusion processing unit comprises operation as the candidate exclusion processing unit configured to generate the binary image for each candidate on the basis of a binary image having a shape of a contour that is simpler than a binary image of the object.

14. The object recognition processing apparatus according to claim 1, wherein the processor is configured with the program to perform operations such that operation as the candidate exclusion processing unit comprises operation as the candidate exclusion processing unit configured to exclude any candidate, among the plurality of candidates, that meets a predetermined condition by generating a three-dimensional binary image for each of the plurality of candidates on the basis of the position and attitude of that candidate and using the three-dimensional binary images to find a degree of overlap for each of the candidates.

15. The object recognition processing apparatus according to claim 1, wherein the processor is configured with the program to perform operations such that operation as the candidate exclusion processing unit comprises operation as the candidate exclusion processing unit configured to exclude any candidate, among the plurality of candidates, that meets a predetermined condition by generating a three-dimensional binary image for each of the plurality of candidates on the basis of the position and attitude of that candidate and using the three-dimensional binary images to find a degree of overlap for each of the candidates.

16. The object recognition processing apparatus according to claim 1, wherein the processor is configured with the program to perform operations such that operation as the candidate exclusion processing unit comprises operation as the candidate exclusion processing unit configured to exclude any candidate, among the plurality of candidates, that meets a predetermined condition by generating a three-dimensional binary image for each of the plurality of candidates on the basis of the position and attitude of that candidate and using the three-dimensional binary images to find a degree of overlap for each of the candidates.

17. An object recognition process method executed by a computer, the method comprising:
   obtaining an image including an object to be recognized;
   obtaining a recognition result including a plurality of candidates for the object to be recognized by carrying out a template matching process on the image using a plurality of templates, each template having been created using a two-dimensional image showing the object to be recognized from a given viewpoint and registered in advance;
   excluding any candidate, among the plurality of candidates, that meets a predetermined condition, by generating, for each of the plurality of candidates, a binary image of the object to be recognized on the basis of a position and attitude of the candidate, and finding a degree of overlap of each candidate using the binary image; and
   outputting any candidate, among the plurality of candidates, that remains without being excluded, as a recognition result.

18. A non-transitory computer-readable recording medium storing a program, which, when read and executed, causes a computer to perform operations comprising:
   obtaining an image including an object to be recognized;
   obtaining a recognition result including a plurality of candidates for the object to be recognized by carrying out a template matching process on the image using a plurality of templates, each template having been created using a two-dimensional image showing the object to be recognized from a given viewpoint and registered in advance;
   excluding any candidate, among the plurality of candidates, that meets a predetermined condition, by generating, for each of the plurality of candidates, a binary image of the object to be recognized on the basis of a position and attitude of the candidate, and finding a degree of overlap of each candidate using the binary image; and
   outputting any candidate, among the plurality of candidates, that remains without being excluded, as a recognition result.

* * * * *